US012449144B2

(12) United States Patent
Yamaguchi

(10) Patent No.: US 12,449,144 B2
(45) Date of Patent: Oct. 21, 2025

(54) VENTILATOR WITH HUMIDITY CONTROL FUNCTION

(71) Applicant: Panasonic Intellectual Property Management Co., Ltd., Osaka (JP)

(72) Inventor: Shotaro Yamaguchi, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 144 days.

(21) Appl. No.: 18/550,227

(22) PCT Filed: Feb. 24, 2022

(86) PCT No.: PCT/JP2022/007477
§ 371 (c)(1),
(2) Date: Sep. 12, 2023

(87) PCT Pub. No.: WO2022/209446
PCT Pub. Date: Oct. 6, 2022

(65) Prior Publication Data
US 2024/0159405 A1 May 16, 2024

(30) Foreign Application Priority Data
Mar. 29, 2021 (JP) ................. 2021-054504

(51) Int. Cl.
F24F 6/00 (2006.01)
F24F 7/08 (2006.01)
(Continued)

(52) U.S. Cl.
CPC ............... F24F 6/00 (2013.01); F24F 7/08 (2013.01); F24F 11/70 (2018.01); F24F 2110/10 (2018.01); F24F 2110/20 (2018.01)

(58) Field of Classification Search
CPC ...... F24F 6/00; F24F 11/70; F24F 7/08; F24F 2110/20; F24F 2110/10
See application file for complete search history.

(56) References Cited

U.S. PATENT DOCUMENTS 5,598,715 A * 2/1997 Edmisten ................ F24F 3/153
236/44 C

FOREIGN PATENT DOCUMENTS

CA  2588628     * 11/2008
JP  2002-317997 A  10/2002

OTHER PUBLICATIONS

International Search Report issued on Apr. 26, 2022 in International Patent Application No. PCT/JP2022/007477, with English translation.

* cited by examiner

Primary Examiner — Larry L Furdge
(74) Attorney, Agent, or Firm — Rimon P.C.

(57) ABSTRACT

Ventilator includes humidity controller that humidifies or dehumidifies supply airflow, and control unit that controls operation of humidity controller. Control unit brings a relative humidity closer to target humidity, when a temperature of an indoor space is higher than or equal to a first reference temperature and lower than or equal to a second reference temperature, by using the relative humidity of the indoor space and bringing the relative humidity closer to the target humidity, and brings the relative humidity closer to target humidity, when the temperature of the indoor space is lower than the first reference temperature or higher than the second reference temperature, by using a converted relative humidity that is identified assuming that a temperature of the indoor space has changed to a third reference temperature (Continued)

set between the first reference temperature and the second reference temperature, and bringing the relative humidity closer to the target humidity.

2 Claims, 5 Drawing Sheets

(51) Int. Cl.
*F24F 11/70* (2018.01)
*F24F 110/10* (2018.01)
*F24F 110/20* (2018.01)

VENTILATOR WITH HUMIDITY CONTROL FUNCTION

CROSS-REFERENCE OF RELATED APPLICATIONS

This application is the U.S. National Phase under 35 U.S.C. § 371 of International Patent Application No. PCT/JP2022/007477, filed on Feb. 24, 2022, which in turn claims the benefit of Japanese Patent Application No. 2021-054504, filed on Mar. 29, 2021, the entire disclosures of which Applications are incorporated by reference herein.

TECHNICAL FIELD

The present disclosure relates to a ventilator with a humidity control function used in a living space or the like.

BACKGROUND ART

Conventionally, as a device capable of ventilating the air while suppressing a decrease in the performance of cooling or heating, a heat exchange ventilator exchanging heat between a supply airflow and an exhaust airflow, as the device ventilates the air, has been known.

As such a conventional heat exchange ventilator, a heat exchange ventilator with a humidity control function having been already developed. Such a heat exchange ventilator includes a humidity controller provided downstream of a supply air duct through which a supply airflow flows, and a heater provided upstream of the humidity controller so as to adjust the amount of humidification (for example, PTL 1). With such a configuration, because the air after the humidity control can be supplied to the indoor space, it is possible to suppress a decrease in the relative indoor humidity during the winter, or to suppress an increase in the relative indoor humidity during the summer.

CITATION LIST

Patent Literature

PTL 1: Unexamined Japanese Patent Publication No. 2002-317997

SUMMARY OF THE INVENTION

In a conventional heat exchange ventilator with a humidity control function, when the indoor temperature is extremely low and the relative humidity is high, if an operation is started in an attempt to control the relative indoor humidity to a target relative humidity at the same time with an operation of indoor air conditioning, the operation is started as a dehumidification operation, and, when the indoor temperature rises so that the relative humidity drops, the operation is switched to a humidification operation. Therefore, it takes long time for the humidity to reach the target humidity, and comfort is impaired. In addition, when the indoor temperature is extremely high and the relative humidity is low, if the operation is started at the same time with the indoor air conditioning operation, the operation is started as a humidification operation, and, when the indoor temperature drops, so that the relative humidity rises, the operation is switched to the dehumidification operation. Therefore, it takes long time for the humidity to reach the target humidity, and comfort is impaired, disadvantageously.

An object of the present disclosure is to provide a ventilator with a humidity control function capable of suppressing an increase in time for achieving a target humidity, and maintaining the indoor comfort, even when an indoor temperature is extremely low or extremely high at the time when an operation is started.

A ventilator with a humidity control function according to the present disclosure includes: an air supply unit supplying air from an outdoor space to an indoor space via a supply air duct, as a supply airflow; an exhaust unit exhausting the air from the indoor space to the outdoor space via an exhaust air duct, as an exhaust airflow; a humidity controller provided in the supply air duct and humidifying or dehumidifying the supply airflow; and a control unit controlling an operation of the humidity controller. The control unit is configured to bring a relative humidity of the indoor space closer to a target humidity, when a temperature of the indoor space is higher than or equal to a first reference temperature and lower than or equal to a second reference temperature, by performing a first control for using the relative humidity of the indoor space and bringing the relative humidity closer to the target humidity, and to bring the relative humidity of the indoor space closer to the target humidity, when the temperature of the indoor space is lower than the first reference temperature or higher than the second reference temperature, by performing a second control for using a converted relative humidity that is identified assuming that a temperature of the indoor space has changed to a third reference temperature set between the first reference temperature and the second reference temperature and bringing the converted relative humidity closer to the target humidity.

According to the present disclosure, it is possible to provide a ventilator with a humidity control function capable of suppressing an increase in time for achieving a target humidity, and maintaining the indoor comfort even when an indoor temperature is extremely low or extremely high at the time when an operation is started.

DESCRIPTION OF EMBODIMENT

Figure 1:
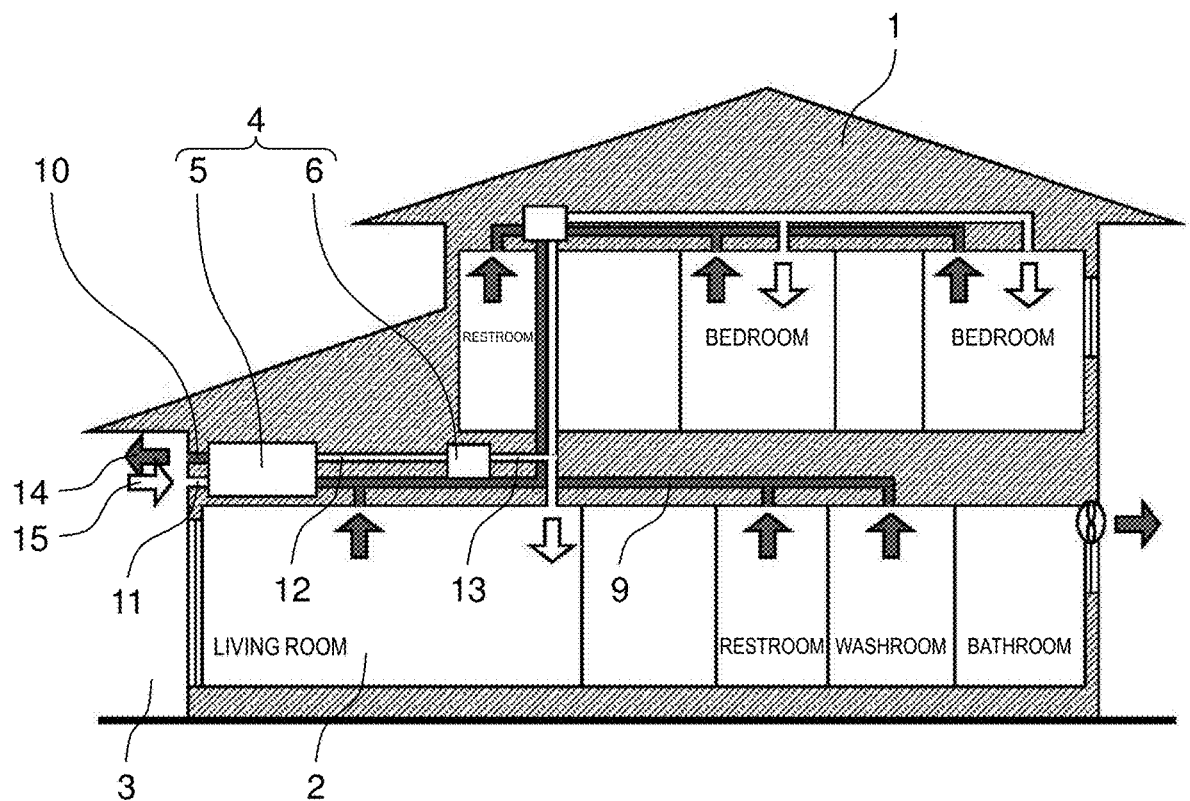
FIG. 1 is a schematic view illustrating an example of how a heat exchange ventilator with a humidity control function according to a first exemplary embodiment of the present disclosure is installed in a house.

A ventilator with a humidity control function according to the present disclosure includes: an air supply unit supplying air from an outdoor space to an indoor space via a supply air duct, as a supply airflow; an exhaust unit exhausting the air from the indoor space to the outdoor space via an exhaust air duct, as an exhaust airflow; a humidity controller provided in the supply air duct and humidifying or dehumidifying the supply airflow; and a control unit controlling an operation of the humidity controller. The control unit is configured to bring a relative humidity of the indoor space closer to a target humidity, when a temperature of the indoor space is higher than or equal to a first reference temperature and lower than or equal to a second reference temperature, by performing a first control for using the relative humidity of the indoor space and bringing the relative humidity closer to the target humidity, and to bring the relative humidity of the indoor space closer to the target humidity, when the temperature of the indoor space is lower than the first reference temperature or higher than the second reference temperature, by performing a second control for using a converted relative humidity that is identified assuming that a temperature of the indoor space has changed to a third reference temperature set between the first reference temperature and the second reference temperature, and bringing the converted relative humidity closer to the target humidity.

With such a configuration, when the indoor temperature is extremely low (at a temperature lower than the first reference temperature) or extremely high (at a temperature higher than the second reference temperature) at the time when the humidity controller starts the humidity control operation, the second control is performed, instead of the first control. Therefore, when the humidity controller starts a dehumidification operation, and then the indoor air conditioning increases the indoor temperature and causes the relative humidity to drop, the dehumidification operation is suppressed from being switched to the humidification operation. Furthermore, when the humidity controller starts the humidification operation, and then the indoor air conditioning decreases the indoor temperature and causes the relative humidity to rise, the humidification operation is suppressed from being switched to the dehumidification operation. As a result, in the ventilator with a humidity control function, it is possible to an increase in time for achieving a target humidity, and to maintain the indoor comfort.

In the ventilator with the humidity control function according to the present disclosure, the converted relative humidity may be a relative humidity calculated assuming that the temperature of the indoor space has changed to the third reference temperature while the absolute humidity corresponding to the relative humidity at the temperature of the indoor space remains constant.

As a result, even when the temperature of the indoor space is extremely low, and the relative humidity is high (e.g., a temperature of 5° C. and a relative humidity of 80%), immediately after the humidity controller starts operating during the winter, the ventilator with a humidity control function performs, assuming that the temperature rises to a third reference temperature (e.g., 24° C.) that is an expected average indoor temperature under an assumption that the temperature of the indoor space is maintained at an appropriate temperature by the air conditioning, the second control of bringing the converted relative humidity (the converted relative humidity being 23% assuming that the temperature rises to 24° C. while the absolute humidity 4.3 g/kg (DA) at the relative humidity of 80% with respect to the temperature of 5° C. remains constant) closer to the target humidity (e.g., 50%). Therefore, even at the start of a humidity control operation, it is possible to determine that the humidity is insufficient and to perform the humidification operation.

Furthermore, even when the temperature of the indoor space is extremely high and the relative humidity is low (e.g., a temperature of 50° C. and a relative humidity of 20%), immediately after the humidity controller starts operating during the summer, the ventilator with a humidity control function performs, assuming that the temperature drops to the third reference temperature (e.g., 24° C.) that is an expected average indoor temperature under an assumption that the temperature of the indoor space is maintained at an appropriate temperature by the air conditioning, the second control of bringing the converted relative humidity (the converted relative humidity being 83% assuming that the temperature drops to 24° C. while the absolute humidity 15.6 g/kg (DA) at the relative humidity of 20% with respect to the temperature of 50° C. remains constant) closer to the target humidity (e.g., 50%). Therefore, even at the start of a humidity control operation, it is possible to determine that the humidity is excessive and to perform the dehumidification operation.

In other words, it is possible to achieve a ventilator with a humidity control function capable of suppressing an increase in time for achieving a target humidity, and maintaining the indoor comfort, even when an indoor temperature is extremely low or extremely high at the time when an operation is started.

An exemplary embodiment of the present disclosure will now be explained with reference to drawings. Note that the following exemplary embodiments are examples embodying the present disclosure, and do not limit the technical scope of the present disclosure. In the present exemplary embodiment, a heat exchange ventilator with a humidity control function will be described as an example of a ventilator with a humidity control function.

First Exemplary Embodiment

Figure 2:
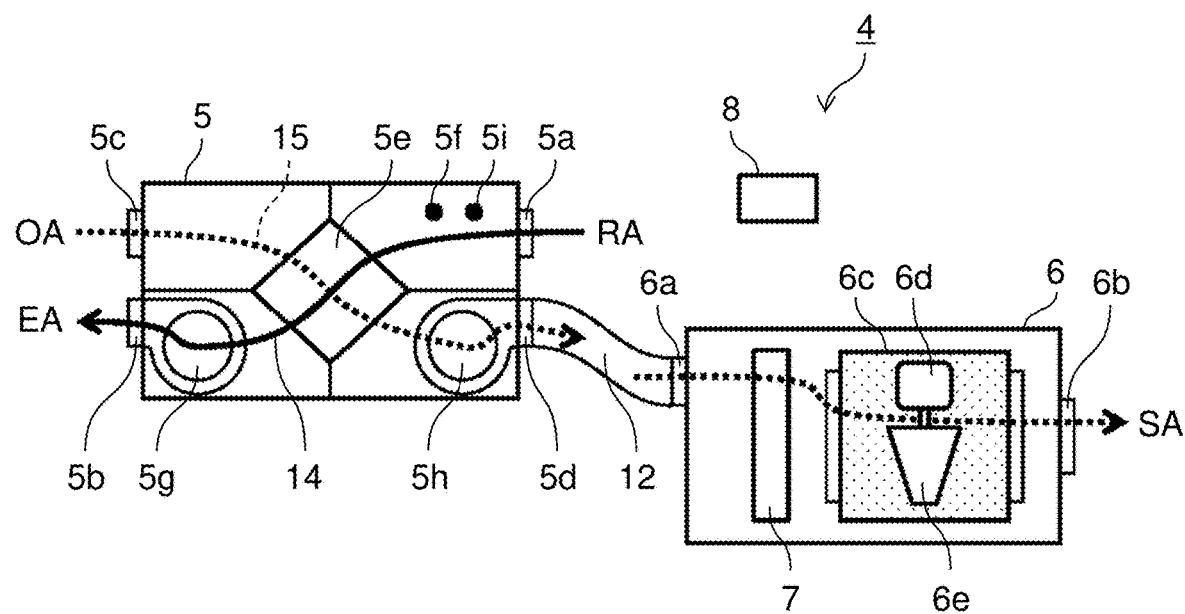
FIG. 2 is a schematic view illustrating a device configuration of the heat exchange ventilator with a humidity control function according to the first exemplary embodiment.

To begin with, heat exchange ventilator 4 with a humidity control function according to a first exemplary embodiment of the present disclosure will be explained with reference to FIGS. 1 and 2. FIG. 1 is a schematic view illustrating an example of how heat exchange ventilator 4 with a humidity control function according to a first exemplary embodiment of the present disclosure is installed in house 1. FIG. 2 is a schematic diagram illustrating a device configuration of heat exchange ventilator 4 with a humidity control function.

As illustrated in FIG. 1, heat exchange ventilator 4 with a humidity control function is installed between floors, in an attic, or the like in house 1, and configured by including heat exchange ventilator 5 and humidity controller 6. In heat exchange ventilator 5, heat exchange ventilator 4 with a humidity control function ventilates the air having heat exchanged between the air (exhaust airflow 14) to be exhausted from indoor space 2 to outdoor space 3 and the air (supply airflow 15) to be supplied from outdoor space 3 to indoor space 2, while humidifying or dehumidifying supply airflow 15 using humidity controller 6, as necessary, before the supply airflow is guided into indoor space 2. In other words, heat exchange ventilator 4 with a humidity control function not only ventilates the air, but also suppresses unnecessary release of heat by transferring the heat of exhaust airflow 14 to supply airflow 15 in the process of the ventilation. Furthermore, supply airflow 15 is humidified or dehumidified so that indoor space 2 is suppressed from being less humid during the winter, and that indoor space 2 is suppressed from being more humid during the summer. Note that heat exchange ventilator 4 with a humidity control function corresponds to a "ventilator with a humidity control function" as mentioned in the claims.

In the example explained herein, exhaust airflow 14 is a flow of the air for exhausting the air from indoor space 2 to outdoor space 3. To begin with, exhaust airflow 14 is conveyed from indoor space 2 to heat exchange ventilator 5 via return air duct 9. Exhaust airflow 14 having the heat exchanged with supply airflow 15 in heat exchange ventilator 5 is discharged from heat exchange ventilator 5 to outdoor space 3 via exhaust air duct 10. Return air duct 9 connects each room of house 1 to heat exchange ventilator 5. Exhaust air duct 10 connects heat exchange ventilator 5 to an exhaust port provided on the outer wall surface of house 1.

Supply airflow 15 is a flow of the air for introducing the air from outdoor space 3 to indoor space 2. To begin with, supply airflow 15 is sent from outdoor space 3 to heat exchange ventilator 5 via outside air duct 11. Supply airflow 15 having heat exchanged with exhaust airflow 14 in heat exchange ventilator 5 is conveyed from heat exchange ventilator 5 to humidity controller 6 via relay air duct 12. Supply airflow 15 having been humidified or dehumidified by humidity controller 6, as required, is introduced from humidity controller 6 into indoor space 2, via supply air duct 13.

Outside air duct 11 connects an air supply port provided on the outer wall surface of house 1, to heat exchange ventilator 5. Relay air duct 12 is disposed in a manner connecting heat exchange ventilator 5 to humidity controller 6. Supply air duct 13 connects humidity controller 6 to each room of house 1.

A specific configuration of heat exchange ventilator 4 with a humidity control function will now be explained with reference to FIG. 2.

As illustrated in FIG. 2, heat exchange ventilator 4 with a humidity control function is configured by including heat exchange ventilator 5 and humidity controller 6. Humidity controller 6 includes air conditioner 7 on the upstream side of humidifier 6c, and the operation thereof is controlled by control unit 8 (see FIG. 3) to be described later.

Heat exchange ventilator 5 is a device that ventilates the air while exchanging heat between air RA (exhaust airflow 14) from indoor space 2 and air OA (supply airflow 15) from outdoor space 3. Specifically, as illustrated in FIG. 2, heat exchange ventilator 5 includes return air port 5a, exhaust port 5b, outer air port 5c, air supply port 5d, heat exchange element 5e, humidity sensor 5f, temperature sensor 5i, exhaust fan 5g, and air supply fan 5h.

Return air port 5a is an inlet port through which the air RA (exhaust airflow 14) from indoor space 2 is introduced into heat exchange ventilator 5 via return air duct 9 (see FIG. 1). Exhaust port 5b is a discharge port for discharging exhaust airflow 14, as exhaust air EA, from heat exchange ventilator 5 into exhaust air duct 10 (see FIG. 1). Outer air port 5c is an inlet port through which supply airflow 15 is introduced into heat exchange ventilator 5 via outside air duct 11 (see FIG. 1). Air supply port 5d is a discharge port for discharging supply airflow 15 from heat exchange ventilator 5 to relay air duct 12.

Heat exchange element 5e is a member for exchanging heat between exhaust airflow 14 and supply airflow 15 (performing sensible heat exchange for exchanging the temperature between exhaust airflow 14 and supply airflow 15, or total heat exchange including not only the sensible heat exchange but also latent heat exchange for exchanging the humidity between exhaust airflow 14 and supply airflow 15). Heat exchange element 5e is a total heat exchange element made of heat transfer paper (heat transfer plate) that is based on cellulose fibers. However, the material is not limited thereto. As the heat transfer plate configuring heat exchange element 5e, for example, a moisture-permeable resin film based on polyurethane or polyethylene terephthalate, or a paper material based on cellulose fiber, ceramic fiber, or glass fiber may be used. As the heat transfer plate configuring heat exchange element 5e, it is also possible to use a thin sheet having heat conductivity and having a property not permeating gas. In this case, heat exchange element 5e serves as a sensible heat exchange element.

Humidity sensor 5f is a sensor that detects the humidity of exhaust airflow 14 introduced via return air port 5a, and is used as an input signal to control unit 8, which is to be described later. Humidity sensor 5f can also be said to be a sensor that detects the humidity of the air in indoor space 2. Temperature sensor 5i is a sensor that detects the temperature of exhaust airflow 14 introduced via return air port 5a, and is used as an input signal to control unit 8, which is to be described later. Temperature sensor 5i can also be said to be a sensor that detects the temperature of the air in indoor space 2.

Exhaust fan 5g is a blower for introducing exhaust airflow 14 via return air port 5a, and discharging exhaust airflow 14 via exhaust port 5b. Air supply fan 5h is a blower for introducing supply airflow 15 via outer air port 5c, and discharging supply airflow 15 via air supply port 5d. Exhaust fan 5g corresponds to an "exhaust unit" as mentioned in the claims, and air supply fan 5h corresponds to an "air supply unit" as mentioned in the claims.

Formed inside heat exchange ventilator 5 are an internal exhaust air duct that communicatively connects return air port 5a to exhaust port 5b, and an internal supply air duct that communicatively connects outer air port 5c to air supply port 5d.

When heat exchange ventilation is performed, heat exchange ventilator 5 causes exhaust fan 5g and air supply fan 5h to operate so that heat exchange element 5e exchanges heat between exhaust airflow 14 flowing through the internal exhaust air duct and supply airflow 15 flowing through the internal supply air duct. In this manner, at the time of ventilation, heat exchange ventilator 5 transfers the heat of exhaust airflow 14 to be discharged to outdoor space 3, to supply airflow 15 that introduces the heat to indoor space 2, so that release of unnecessary heat is suppressed and the heat is recovered to indoor space 2. As a result, when the air is ventilated during the winter, it is possible to suppress a temperature drop in indoor space 2 due to the low-temperature air from outdoor space 3. By contrast, when the air is ventilated during the summer, it is possible to suppress a temperature rise in indoor space 2 due to the high-temperature air from outdoor space 3.

Humidity controller 6 will now be explained. Humidity controller 6 is a device which humidifies or dehumidifies supply airflow 15 having heat exchanged in heat exchange ventilator 5, as necessary. Specifically, as illustrated in FIG. 2, humidity controller 6 includes supply airflow inlet 6a, supply airflow outlet 6b, humidifier 6c, and air conditioner 7.

Supply airflow inlet 6a is an inlet port through which supply airflow 15 is introduced to humidity controller 6 via relay air duct 12. Supply airflow outlet 6b is a discharge port through which supply airflow 15 having passed through humidifier 6c is discharged to supply air duct 13, as supply air SA (see FIG. 1).

Humidifier 6c is a unit for humidifying supply airflow 15 introduced to humidifier 6c. Humidifier 6c includes humidification motor 6d and humidification nozzle 6e. Humidifier 6c has a centrifugal crushing configuration in which humidification motor 6d causes humidification nozzle 6e to rotate, to generate centrifugal force, which in turn, causes the stored water to be suctioned, scattered, collide with, and to be crushed against the periphery (centrifugal direction), so that the air passing therethrough is humidified. Humidifier 6c changes the rotation speed (hereinafter, a rotational output value) of humidification motor 6d based on an output signal from control unit 8, to be described later, and adjusts the humidification capacity (humidification amount).

The liquid added to the air in humidifier 6c may be other than water, and may be a liquid such as hypochlorous acid water having sterilizability or deodorizability, for example. In this case, the hypochlorous acid water is added to supply airflow 15 and supplied to the indoor space 2, so that indoor space 2 can be sterilized or deodorized.

As illustrated in FIG. 2, air conditioner 7 is a unit disposed inside humidity controller 6, and heats or cools supply airflow 15 introduced thereto. Air conditioner 7 changes an operation status (ON/OFF of heating/cooling operation and dehumidification operation) based on an output signal from control unit 8, which is to be described later, and adjusts a heating capacity (heating amount) or a cooling capacity (cooling amount) of the introduced supply airflow 15. For example, air conditioner 7 includes an indoor unit of a room air conditioner (RAC), and heats or cools supply airflow 15, as necessary.

Air conditioner 7 may be configured as a combination of a plurality of heaters and coolers. As an example of the heater, a positive temperature coefficient (PTC) heater may be used. A PTC sensor has a characteristic of gradually coming to resist a current flow more as the temperature rises, so as to suppress wasteful power consumption. As an example of the cooler, a Peltier element, which is enabled to transfer heat by passing a current therethrough, may be used.

Although details of the control will be described later, in heat exchange ventilator 4 with a humidity control function, when an output capacity value is lower than a first reference value, air conditioner 7 is configured to cool to dehumidify supply airflow 15 having exchanged heat. When the output capacity value exceeds a third reference value, air conditioner 7 disposed in the front stage (upstream) of humidifier 6c heats supply airflow 15 having exchanged heat so as to enhance the humidification capacity. The output capacity value herein is a value serving as an index of the capacity of humidity controlled (the amount by which humidity is controlled) by entire heat exchange ventilator 4 with a humidity control function. The output capacity value can also be said to be a value for determining the amount of humidification or the amount of dehumidification required for humidity controller 6 to bring the humidity of the air in indoor space 2 close to the target humidity.

Figure 3:
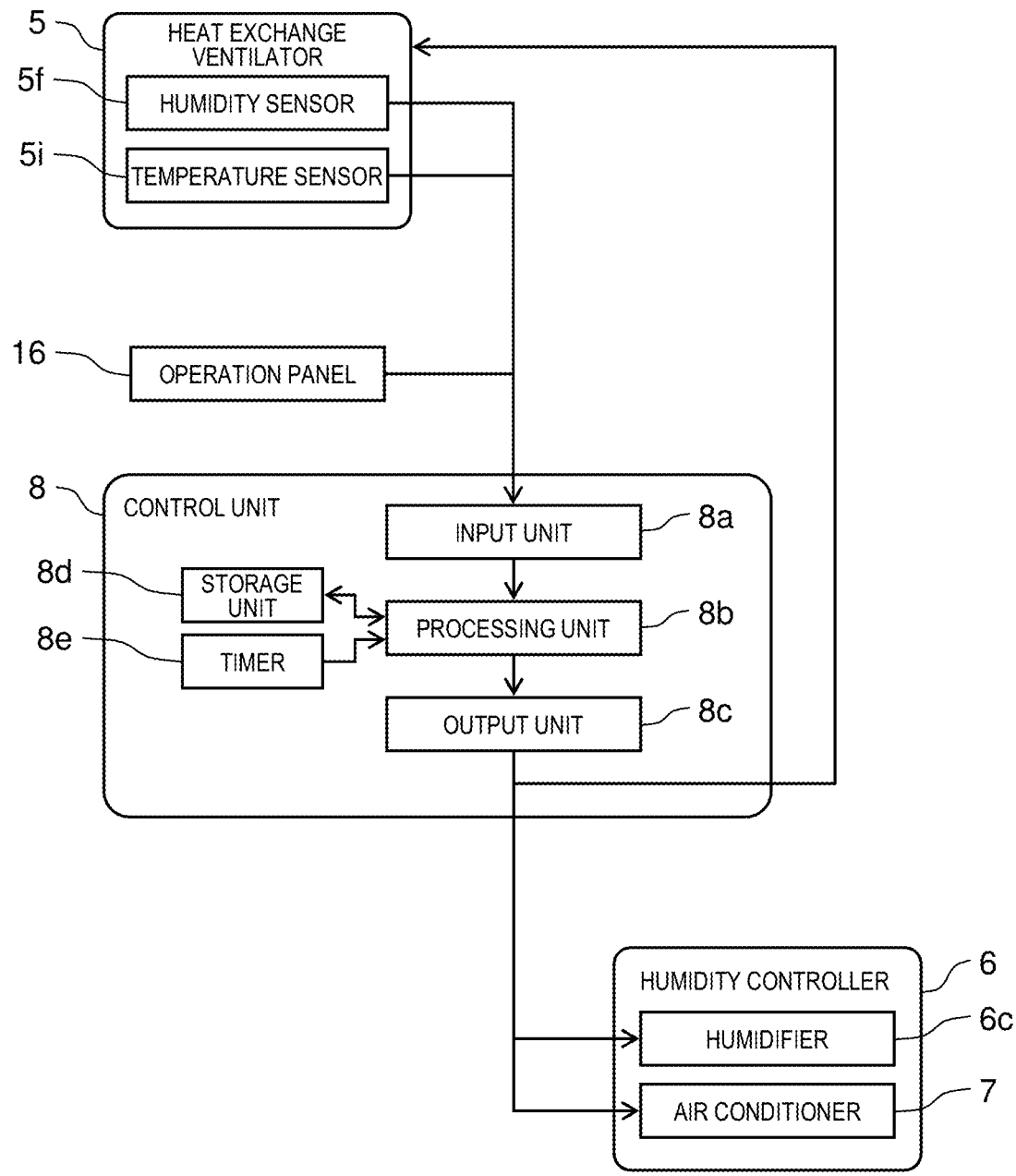
FIG. 3 is a block diagram illustrating a configuration of a control unit in the heat exchange ventilator with a humidity control function according to the first exemplary embodiment.

Control in a humidity control operation of heat exchange ventilator 4 with a humidity control function will now be explained with reference to FIG. 3. FIG. 3 is a schematic functional block diagram illustrating a configuration of control unit 8 in heat exchange ventilator 4 with a humidity control function.

Control unit 8 controls the operation of humidity controller 6. Specifically, as illustrated in FIG. 3, control unit 8 includes input unit 8a, processing unit 8b, output unit 8c, storage unit 8d, and timer 8e.

Input unit 8a receives information for starting/ending the humidity control operation, the information being output from operation panel 16 installed in indoor space 2; information of a humidity setting (target humidity) for the air in indoor space 2; information of the humidity (indoor humidity) of the air in indoor space 2, the information output from humidity sensor 5f of heat exchange ventilator 5; and information of the temperature (indoor temperature) of the air in indoor space 2, the information being output from temperature sensor 5i in heat exchange ventilator 5. Input unit 8a then outputs these received pieces of information to processing unit 8b.

Timer 8e measures the time, and outputs the time to processing unit 8b.

Figure 6:
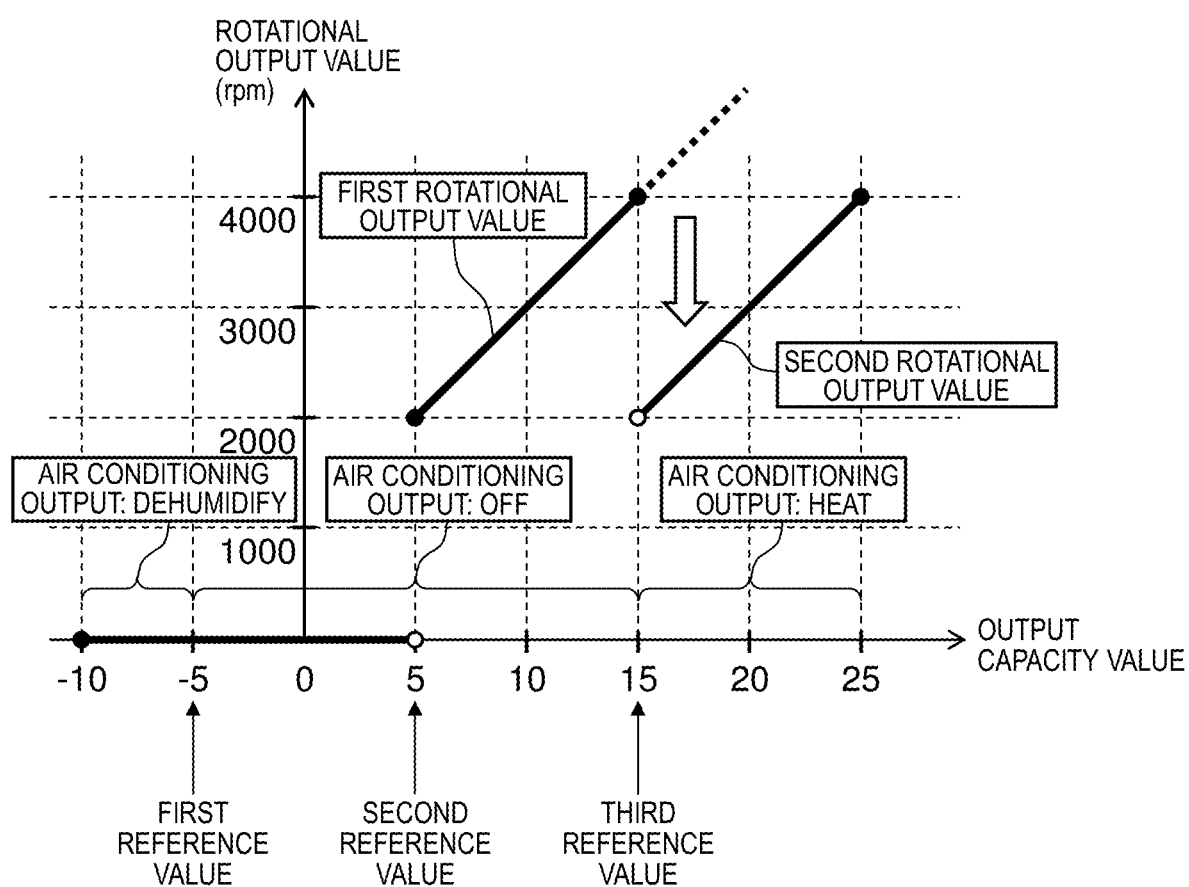
FIG. 6 is a graph illustrating a relationship among an output capacity value, a rotational output value, and an air conditioning output, which are used for processing performed by the processing unit of the control unit in the heat exchange ventilator with a humidity control function according to the first exemplary embodiment.

Storage unit 8d stores therein past converted relative humidities, past output capacity values, and calculation parameters, and receives and stores a current converted relative humidity and a current output capacity value output from processing unit 8b. Output capacity values, rotational output values and an operation status (air conditioning output) of air conditioner 7 corresponding to each output capacity value, as illustrated in FIG. 6 to be described later, are stored in a manner associated with each other. Each of these pieces of stored information is output from storage unit 8d to processing unit 8b, in response to a request from processing unit 8b.

The converted relative humidity herein is humidity obtained by converting the indoor humidity into a relative humidity at an expected temperature under an assumption that the indoor temperature is maintained at an appropriate temperature by the air conditioning, so that the indoor is dehumidified and humidified appropriately even when the indoor temperature is extreme. As mentioned earlier, the output capacity value is an index of the capacity of humidity controlled (the amount by which the humidity is controlled) by entire heat exchange ventilator 4 with a humidity control function. The rotational output value is the rotation speed of humidification motor 6d. The relationship between the output capacity value and, the rotational output value and the air conditioning output will be described later.

Processing unit 8b performs predetermined processing at regular time intervals (e.g., five minutes in the present exemplary embodiment) based on the time information output from timer 8e. Specifically, processing unit 8b converts a relative indoor humidity into a converted relative humidity using the past indoor humidity information, the past output capacity value, and the calculation parameters output from storage unit 8d, and the current humidity information and the current temperature information output from input unit 8a, and calculates an output capacity value for bringing the converted relative humidity closer to the target humidity. Processing unit 8b then determines a rotational output value and an air conditioning output (ON/OFF of heating/cooling and dehumidification operation) for humidity controller 6 based on the calculated output capacity value, and outputs the rotational output value and the air conditioner output to output unit 8c. Details will be described later with reference to a flowchart (see FIG. 4).

Output unit 8c outputs the rotational output value received from processing unit 8b to humidification motor 6d of humidifier 6c. Output unit 8c outputs the air conditioning output information received from processing unit 8b to air conditioner 7. Humidification motor 6d in humidifier 6c then executes a rotating operation based on the rotational output value received from output unit 8c. Air conditioner 7 starts or ends the heating operation or the dehumidification operation based on the air conditioning output information received from output unit 8c.

Control unit 8 includes a computer system including a processor and a memory. The processor then executes a program stored in the memory, to cause the computer system to function as a controller. In the explanation herein, the program executed by the processor is recorded in the memory of the computer system in advance, but may also be provided by being recorded in a non-transitory recording medium such as a memory card, or provided over a telecommunication circuit such as the Internet.

Figure 4:
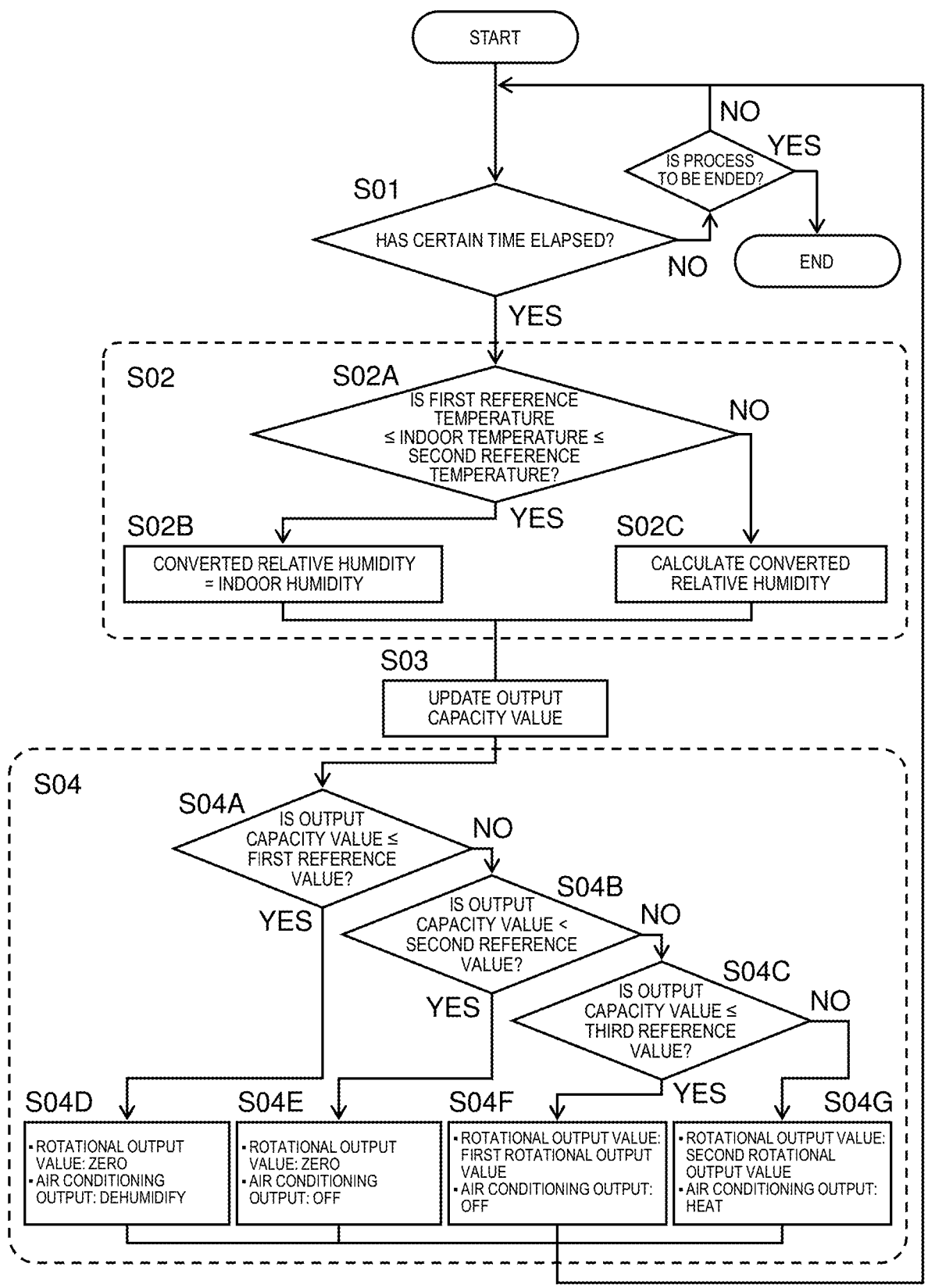
FIG. 4 is a flowchart illustrating processing performed by a processing unit in a control unit included in the heat exchange ventilator with a humidity control function according to the first exemplary embodiment.
Figure 5:
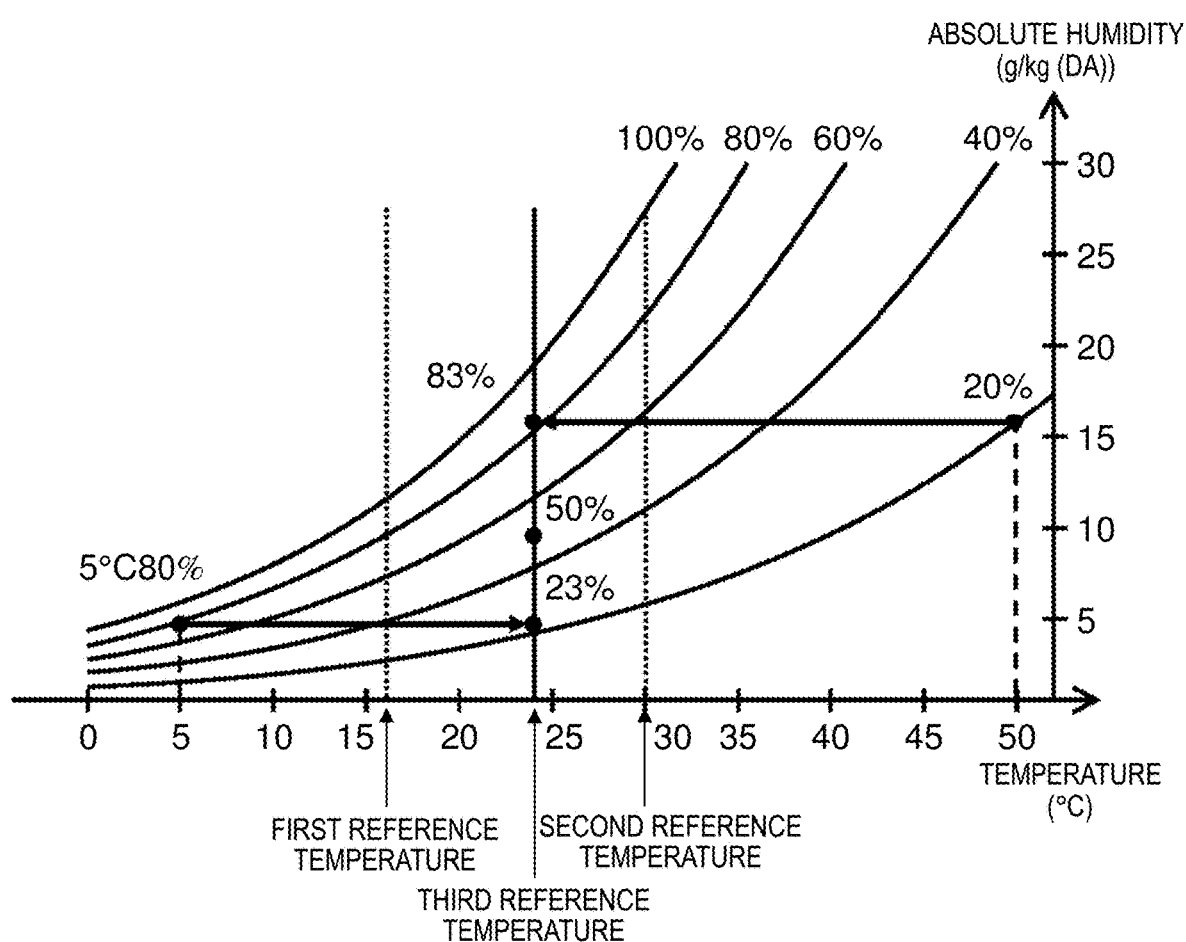
FIG. 5 is a psychrometric chart for explaining the method for calculating a converted relative humidity according to the first exemplary embodiment.

The sequence of control performed by control unit 8 in heat exchange ventilator 4 with a humidity control function will now be explained with reference to FIGS. 4 to 6. FIG. 4 is a flowchart illustrating control performed by control unit 8 in heat exchange ventilator 4 with a humidity control function. FIG. 5 is a psychrometric chart for explaining a method of calculating a converted relative humidity. FIG. 6 is a graph showing a relationship between rotational output values and output capacity values used in control performed by control unit 8 included in heat exchange ventilator 4 with a humidity control function.

In the present exemplary embodiment, correlations are indicated assuming that the controllable range of the rotational output value of humidification motor 6d is 0 rpm, and 2000 rpm to 4000 rpm, and the settable range of the output capacity value is "−10" to "25". In the flowchart, a reference numeral having "S" as an initial letter is assigned to each processing step. For example, "S01" or the like refers to a processing step. The magnitude of the numerical value indicating the processing step has no relation to the order at which these processes are performed.

As illustrated in FIG. 4, the process performed by control unit 8 mainly includes four steps (steps S01 to S04), and starts upon receiving a signal for starting the humidity control operation from operation panel 16.

Step S01 is a step of ensuring the process to be performed at a processing interval stored in storage unit 8d. For example, when the processing interval is five minutes, processing unit 8b keeps determining the time until five minutes elapse, by receiving the time information output from timer 8e. When five minutes have elapsed, the processing is shifted to step S02. When a signal for ending the humidity control operation is received from operation panel 16 before five minutes elapse, the process is ended.

Step S02 is a step of calculating a converted relative humidity. To begin with, processing unit 8b determines a magnitude relationship between the indoor temperature input from input unit 8a, and a first reference temperature and a second reference temperature stored in storage unit 8d (step S02A). At this time, the first reference temperature is set to a lowest temperature (e.g., 16° C.) of indoor space 2 under an assumption that indoor space 2 is kept at an appropriate temperature by the air conditioning. The second reference temperature is set to a highest temperature (e.g., 30° C.) of indoor space 2, under an assumption that indoor space 2 is maintained at an appropriate temperature by the air conditioning.

Then, as the first control, if the indoor temperature is higher than or equal to the first reference temperature and is lower than or equal to the second reference temperature, processing unit 8b determines that the indoor temperature is being maintained at an appropriate temperature by the air conditioning, and uses the indoor humidity as a converted relative humidity as it is (YES in step S02A→step S02B). As the second control, if the indoor temperature is lower than the first reference temperature (takes a value less than the first reference temperature) or higher than the second reference temperature (takes a value exceeding the second reference temperature), processing unit 8b determines that the indoor temperature is not maintained to an appropriate temperature by air conditioning, and calculates a relative indoor humidity assuming that the indoor temperature has changed to a third reference temperature while the absolute indoor humidity remains constant, and identifies the calculated relative indoor humidity as the converted relative humidity (NO in step S02A→step S02C). The third reference temperature herein is a temperature set between the first reference temperature and the second reference temperature, and is set to an average temperature (e.g., 24° C.) of indoor space 2 under an assumption that indoor space 2 is maintained at an appropriate temperature by the air conditioning.

A specific example of a method of calculating the converted relative humidity will now be explained with reference to FIG. 5. In the present exemplary embodiment, a case where the first reference temperature is set to 16° C., the second reference temperature is set to 30° C., and the third reference temperature is set to 24° C. will be described.

In the first control, for example, when the indoor temperature is 24° C. and the indoor humidity is 50%, because the indoor temperature is higher than or equal to the first reference temperature (16° C.) and lower than or equal to the second reference temperature (30° C.), the indoor humidity (50%) is used as it is as the converted relative humidity (YES in step S02A→step S02B).

In the second control, as an example, if the indoor temperature is 5° C. and the indoor humidity is 80%, because the indoor temperature is lower than the first reference temperature (16° C.), under an assumption that the indoor temperature has changed to the third reference temperature (24° C.) while the absolute indoor humidity remains constant (4.3 g/kg (DA)), processing unit 8b calculates a relative indoor humidity as 23%, and identifies the relative indoor humidity as the converted relative humidity (NO in step S02A→step S02C). By performing such a calculation, even when the indoor temperature has not been maintained at an appropriate temperature by the air conditioning, the output capacity value can be calculated assuming a condition in which the indoor temperature is being maintained by the air conditioning. Furthermore, in the second control, when the indoor temperature is 50° C. and the indoor humidity is 20%, because the indoor temperature is higher than 30° C., under an assumption that the indoor temperature has changed to 24° C., which is the third reference temperature, while the absolute indoor humidity remains constant (15.6 g/kg (DA)), processing unit 8b calculates a relative indoor humidity as 83%, and identifies the relative indoor humidity as the converted relative humidity (NO in step S02A→step S02C). By performing such a calculation, even when the indoor temperature has not been maintained at an appropriate temperature by the air conditioning, the output capacity value can be calculated assuming a condition in which the indoor temperature is being maintained by the air conditioning. Note that, as a specific calculation formula in step S02C, for example, an approximate formula indicated in following Equation (1) may be used.

[Equation 1]

$$H' = H \times 10^{\left(1779.75 \times \left(\frac{1}{T_3+237.3} - \frac{1}{T+237.3}\right)\right)} \quad (1)$$

where H' denotes a converted relative humidity; H denotes an indoor humidity input from input unit 8a; T denotes an indoor temperature input from input unit 8a; and $T_3$ is a third reference temperature that is the calculation parameter stored in storage unit 8d.

For example, by using a value "80" as the indoor humidity H, "5" as the indoor temperature T, and "24" as the third reference temperature $T_3$ in Equation (1), converted relative humidity H' can be calculated as a value "23". For example, by using values "20" as the indoor humidity H, "50" as the indoor temperature T, and "24" as the third reference temperature T3 in Equation (1), converted relative humidity H' can be calculated as a value "83".

Step S03 is a step of updating the output capacity value. In this step, processing unit 8b updates the output capacity value based on the information output from input unit 8a and storage unit 8d, and shifts the processing to step S03. As an example of a calculation formula used in the update, a proportional integral differential (PID) control formula indicated in following Equation (2) may be used.

[Equation 2]

$$R = R + K_p \times \left\{ (\Delta X_0 - \Delta X_1) + \left(\frac{1}{T_i}\right) \times \Delta X_0 + T_d \times [(\Delta X_0 - \Delta X_1) - (\Delta X_1 - \Delta X_2)] \right\} \quad (2)$$

where R denotes an output capacity value; $K_p$, $T_i$, and $T_d$ denote PID parameters that are calculation parameters stored in the storage unit 8d; and $\Delta X_0$, $\Delta X_1$, and $\Delta X_2$ denote values that are based on a current, a first previous, and a second previous differences calculated as "converted relative humidity subtracted from the target humidity", respectively. Although it depends on the way how the change takes place, generally, when the converted relative humidity is below the target humidity, $\Delta X_0$ takes a positive value and the output capacity value is increased. When the converted relative humidity is above the target humidity, $\Delta X_0$ takes a negative value and the output capacity value is decreased.

Step S04 is a step of determining the rotational output value and the air conditioning output based on the updated output capacity value.

To begin with, processing unit 8b determines a magnitude relationship between the first reference value stored in storage unit 8d and the updated output capacity value (step S04A). If the output capacity value is equal to or smaller than the first reference value, processing unit 8b determines to set the rotational output value to 0 rpm, and to set the air conditioning output to "dehumidify" (YES in step S04A→step S04D). If the output capacity value is greater than the first reference value, processing unit 8b shifts the processing to the determination in step 04B. In the present exemplary embodiment, the first reference value is set to "−5".

In step 04B, processing unit 8b determines a magnitude relationship between a second reference value stored in storage unit 8d and the updated output capacity value. If the output capacity value is smaller than the second reference value, processing unit 8b determines to set the rotational output value to 0 rpm, and to set the air conditioning output to "off" (YES in step S04B→step S04E). If the output capacity value is equal to or greater than the second reference value, processing unit 8b shifts the process to the determination in step 04C. In the present exemplary embodiment, the second reference value is set to "5".

In step 04C, processing unit 8b determines a magnitude relationship between the third reference value stored in storage unit 8d and the updated output capacity value. If the output capacity value is equal to or smaller than the third reference value, processing unit 8b determines to set the rotational output value to a first rotational output value, and to set the air conditioning output to "off" (YES in step S04C→step S04E). In the present exemplary embodiment, the third reference value is set to "15".

If the output capacity value is greater than the third reference value, processing unit 8b determines to set the rotational output value to a second rotational output value, and to set the air conditioning output to "heat" (NO in step S04C→step S04G).

As illustrated in FIG. 6, the first rotational output value is a value representing a rotational output value corresponding to an output capacity value equal to or greater than the second reference value and equal to or smaller than the third reference value. As illustrated in FIG. 6, the second rotational output value is a value representing the rotational output value corresponding to an output capacity value exceeding the third reference value.

The processing in step S04 will now be explained specifically.

The first reference value is a threshold of the output capacity value at which humidity controller 6 is caused to perform the dehumidification operation, and when the output capacity value falls below the first reference value, humidity controller 6 is caused to perform a dehumidification operation. Specifically, when the indoor humidity is higher than the target humidity, and requires dehumidification, the output capacity value is reduced in accordance with Equation (2). As a result, when the output capacity value is smaller than the first reference value, the air conditioning output of air conditioner 7 in humidity controller 6 is set to "dehumidify", and the dehumidification operation is performed (the part where the output capacity value is smaller than "−5" in FIG. 6).

The second reference value is a threshold of the output capacity value at which humidity controller 6 is caused to perform the humidification operation, and, when the output capacity value is equal to or greater than the second reference value, humidity controller 6 is caused to perform the humidification operation. Specifically, when the indoor humidity is lower than the target humidity and requires humidification, the output capacity value is increased in accordance with Equation (2). As a result, when the output capacity value becomes equal to or greater than the second reference value, humidification motor 6d in humidity controller 6 is caused to rotate in accordance with the first rotational output value (the part where the output capacity value equal to or greater than "5" and equal to or smaller than "15" in FIG. 6).

Therefore, when the output capacity value is between the first reference value and the second reference value, humidity controller 6 is set to "off", and the air conditioning output of air conditioner 7 is set to "off", and the rotation speed of the humidification motor 6d is also set to "zero" (the part where the output capacity value is equal to or greater than "−5" and equal to or smaller than "5" in FIG. 6).

The third reference value is a threshold of the output capacity value at which humidity controller 6 is caused to increase the output of the humidification operation by one level, and when the output capacity value exceeds the third reference value, humidity controller 6 is caused to increase the output of the humidification operation by one level. Specifically, even if the output capacity value is equal to or greater than the second reference value but the indoor humidity is still lower than the target humidity and still requires humidification, the output capacity value is further increased in accordance with Equation (2). As a result, when the output capacity value exceeds the third reference value, the air conditioning output of air conditioner 7 in humidity controller 6 is set to "heat", and the rotation speed of humidification motor 6d takes the second rotational output value (the part where the output capacity value is greater than "15" and equal to or smaller than "25" in FIG. 6). By setting the air conditioning output of air conditioner 7 to "heat", the temperature of supply airflow 15 flowing into humidifier 6c is increased, so that the supply airflow 15 can be further humidified.

In the present exemplary embodiment, the controllable range of the rotational output value of humidification motor 6d is 2000 rpm to 4000 rpm. Therefore, the rotational output value corresponding to the second reference output capacity value "5" is set to 2000 rpm; the rotational output value corresponding to the third reference output capacity value "15" is set to 4000 rpm; and the first rotational output value is set by linearly interpolating these rotational output values. When the humidification capacity exceeds the third reference capacity, and the air conditioning output is set to "heat" to further increase the humidification capacity by one level, the second rotational output value is set by linearly interpolating the rotation speed 2000 rpm corresponding to the third reference output capacity value "15", and the rotation speed 4000 rpm corresponding to the upper bound output capacity value "25".

To express using specific formulas, the first rotational output value is calculated as $X_1=2000+(R-5)\times 2000$, and the second rotational output value is calculated as $X_2=2000+(R-15)\times 2000$. Note that $X_1$ denotes the first rotational output value, $X_2$ denotes the second rotational output value, and R denotes the output capacity value.

As described above, control unit 8 first uses the temperature information of indoor space 2 and the humidity information of indoor space 2 to calculate a converted relative humidity for allowing humidification or dehumidification to be performed appropriately even when the temperature of indoor space 2 is an extreme temperature. Control unit 8 then calculates an output capacity value using the converted relative humidity and the target humidity information, determines whether indoor space 2 requires humidification or dehumidification, and outputs a rotational output value for humidification motor 6d of humidifier 6c and air conditioning output information for air conditioner 7. As a result, it is possible to bring the converted relative humidity of indoor space 2 closer to the target humidity.

As described above, with heat exchange ventilator 4 with a humidity control function according to the first exemplary embodiment, the following advantageous effects can be achieved.

(1) Heat exchange ventilator 4 with a humidity control function includes: air supply fan 5h supplying air from outdoor space 3 to indoor space 2 via a supply air duct, as supply airflow 15; exhaust fan 5g exhausting the air from the indoor space 2 to outdoor space 3 via an exhaust air duct, as exhaust airflow 14; humidity controller 6 provided in the supply air duct and humidifying or dehumidifying supply airflow 15; and control unit 8 controlling an operation of humidity controller 6. Control unit 8 is configured to bring a relative humidity of indoor space 2 closer to a target humidity, when a temperature of indoor space 2 is higher than or equal to a first reference temperature and lower than or equal to a second reference temperature, by performing a first control for using the relative humidity of indoor space 2 and bringing the relative humidity closer to the target humidity, and to bring the relative humidity of indoor space 2 closer to the target humidity, when the temperature of indoor space 2 is lower than the first reference temperature or higher than the second reference temperature, by performing a second control for using a converted relative humidity that is identified assuming that a temperature of indoor space 2 has changed to a third reference temperature set between the first reference temperature and the second reference temperature and bringing the converted relative humidity closer to the target humidity.

As a result, when the indoor temperature is extremely low (at a temperature lower than the first reference temperature) or extremely high (at a temperature higher than the second reference temperature) at the time when humidity controller 6 starts the humidity control operation, the second control is performed, instead of the first control. Therefore, when humidity controller 6 starts a dehumidification operation, and then the indoor air conditioning increases the indoor temperature and causes the relative humidity to drop, the dehumidification operation is prevented from being switched to the humidification operation; and when humidity controller 6 starts the humidification operation, and then the indoor air conditioning decreases the indoor temperature and causes the relative humidity to rise, the humidification operation is prevented from being switched to the dehumidification operation. In this manner, in heat exchange ventilator 4 with a humidity control function, it is possible to suppress an increase in time for achieving a target humidity, and to maintain the comfort in indoor space 2.

(2) In heat exchange ventilator 4 with a humidity control function, the converted relative humidity is a relative humidity calculated assuming that the temperature of indoor space 2 has changed to the third reference temperature while an absolute humidity corresponding to the relative humidity at the temperature of indoor space 2 remains constant.

As a result, even when the temperature of indoor space 2 is extremely low and the relative humidity is high (e.g., a temperature of 5° C. and a relative humidity of 80%) immediately after humidity controller 6 starts operating in the winter, the heat exchange ventilator 4 with a humidity control function performs, assuming that the temperature rises to a third reference temperature (e.g., 24° C.) that is an expected ordinary indoor temperature, control of bringing the relative humidity (a relative humidity of 23% assuming that the temperature rises to 24° C. while the absolute humidity 4.3 g at the relative humidity of 80% with respect to the temperature of 5° C. remains constant) closer to the target humidity (e.g., 50%). Therefore, even at the start of a humidity control operation, it is possible to determine that the humidity is insufficient and to perform the humidification operation.

Furthermore, even when the temperature of indoor space 2 is extremely high and the relative humidity is low (e.g., a temperature of 50° C. and a relative humidity of 20%) immediately after humidity controller 6 starts operating in the summer, the heat exchange ventilator 4 with a humidity control function performs, assuming that the temperature drops to the third reference temperature (e.g., 24° C.) that is an expected ordinary indoor temperature, control of bringing the relative humidity (a relative humidity of 83% assuming that the temperature rises to 24° C. while the absolute humidity 15.6 g at the relative humidity of 20% with respect to the temperature of 50° C. remains constant) closer to the target humidity (e.g., 50%). Therefore, even at the start of a humidity control operation, it is possible to determine that the humidity is excessive and to perform the dehumidification operation.

In other words, it is possible to provide heat exchange ventilator 4 with a humidity control function capable of suppressing an increase in time for achieving a target humidity, and maintaining the comfort of the indoor space 2, even when an indoor temperature is extremely low or extremely high.

Note that, when the absolute humidity is used in the humidity control, it is possible to control the absolute indoor humidity to the target absolute humidity quickly, regardless of the temperature of indoor space 2. In such a case, it is also possible to set the target value to the absolute humidity at which the target relative humidity is achieved at the temperature setting of the indoor air conditioning. However, depending on how indoor space 2 is air-conditioned, the indoor temperature may stabilize at a temperature different from the temperature setting. For example, if the temperature of indoor space 2 stabilizes at a temperature higher than the temperature setting, the relative humidity of indoor space 2 drops, and the comfort is impaired. Even in such a case, with heat exchange ventilator 4 with a humidity control function, it is possible to provide heat exchange ventilator 4 with a humidity control function capable of maintaining the comfort of indoor space 2 while suppressing an increase in time for achieving a target humidity.

The present disclosure has been described above based on the exemplary embodiment. It is to be understood by those skilled in the art that these exemplary embodiments are merely examples, that there are still various possible modifications in combinations of the components or the processes, and that such modifications also fall within the scope of the present disclosure.

In heat exchange ventilator 4 with a humidity control function according to the first exemplary embodiment, the centrifugal crushing humidifier is used as humidifier 6c configuring humidity controller 6, but the present invention is not limited thereto. For example, humidifier 6c may be an ultrasonic humidifier configured to scatter water particles using ultrasonic waves; a heating humidifier configured to generate water vapor by heating; a gasifying humidifier configured to gasify moisture by allowing the air to pass through a filter or the like containing water; or a combination thereof. When these configurations are used, the amplitude of the ultrasonic wave, the amount of heating, or the amount of moisture dropped on the filter may be used as parameter values corresponding to an output capacity value.

INDUSTRIAL APPLICABILITY

The heat exchange ventilator with a humidity control function according to the present disclosure can suppress an increase in time for achieving a target humidity and maintain indoor comfort, even when an indoor temperature is extremely low or extremely high at the time when an operation is started, and is useful as a ventilator having a humidity control function.

REFERENCE MARKS IN THE DRAWINGS

1 house
2 indoor space
3 outdoor space
4 heat exchange ventilator with a humidity control function
5 heat exchange ventilator
5a return air port
5b exhaust port
5c outer air port
5d air supply port
5e heat exchange element
5f humidity sensor
5g exhaust fan
5h air supply fan
5i temperature sensor
6 humidity controller
6a supply airflow inlet
6b supply airflow outlet
6c humidifier
6d humidification motor
6e humidification nozzle
7 air conditioner
8 control unit
8a input unit
8b processing unit
8c output unit
8d storage unit
8e timer
9 return air duct
10 exhaust air duct
11 outside air duct
12 relay air duct
13 supply air duct
14 exhaust airflow
15 supply airflow
16 operation panel

The invention claimed is:

1. A ventilator with a humidity control function, the ventilator comprising:
an air supply unit supplying air from an outdoor space to an indoor space via a supply air duct, as a supply airflow;
an exhaust unit exhausting the air from the indoor space to the outdoor space via an exhaust air duct, as an exhaust airflow;
a humidity controller provided in the supply air duct and humidifying or dehumidifying the supply airflow;
a temperature sensor for detecting a temperature of the air in the indoor space;
a humidity sensor for detecting a humidity of the air in the indoor space;
an input unit for receiving information of a target humidity of the air in the indoor space;
a storage unit storing a first reference temperature and a second reference temperature; and
a control unit controlling an operation of the humidity controller, wherein
the control unit is configured:
to control the humidity controller to adjust the humidity of the indoor space closer to the target humidity received by the input unit, when the temperature of the air of the indoor space detected by the temperature sensor is higher than or equal to the first reference temperature and lower than or equal to the second reference temperature, and to control the humidity controller to adjust a converted relative humidity of the indoor space closer to the target humidity received by the input unit, when the temperature of the air of the indoor space detected by the temperature sensor is lower than the first reference temperature or higher than the second reference temperature, the converted relative humidity being a relative humidity of the indoor space when the temperature of the indoor space has changed to a third reference temperature set between the first reference temperature and the second reference temperature.

2. The ventilator with the humidity control function according to claim 1, wherein the converted relative humidity is a relative humidity calculated assuming that the temperature of the indoor space has changed to the third reference temperature while an absolute humidity corresponding to the humidity at the temperature of the indoor space remains constant.

* * * * *